Dec. 29, 1970   O. V. TAMRUCHI   3,551,014
JOINT OF THIN-WALLED MEMBERS
Filed Nov. 28, 1966   3 Sheets-Sheet 2

Dec. 29, 1970   O. V. TAMRUCHI   3,551,014
JOINT OF THIN-WALLED MEMBERS
Filed Nov. 28, 1966   3 Sheets-Sheet 3

United States Patent Office 3,551,014
Patented Dec. 29, 1970

---

3,551,014
JOINT OF THIN-WALLED MEMBERS
Oleg Vladimirovich Tamruchi, 1 Khoroskevsky proezd 10, korpus 2, kv. 77, Moscow, U.S.S.R.
Filed Nov. 28, 1966, Ser. No. 597,434
Int. Cl. F16b 5/00
U.S. Cl. 287—189.36                             2 Claims

ABSTRACT OF THE DISCLOSURE

A permanent joint of thin-walled members, preferably constituted of a plastic material wherein at least one of the members has a groove in which the edge of another member is inserted and pressed thereagainst by the forceable insertion in the groove of an open channel member, the contacting walls of the member having a glue compound applied thereto which sets under the pressure of the walls against one another.

BRIEF SUMMARY OF THE INVENTION

The present invention relates to three-dimensional structures and more particularly to joints of thin-walled members, preferably plastic ones used in bodies of transport means, for example, and joined by the aid of glue.

Known designs of transport means bodies made of thin-walled members comprise a frame with thin-walled members and panels attached thereto by the aid of rivets, screws or glue.

The designs of such framed bodies have a large number of members, the process of assembling which requires much labor, not readily adaptable to mechanization which is so essential for mass production.

An object of the present invention is to eliminate these disadvantages.

The principal object of the invention is to provide a reliable joint of thin-walled members, preferably plastic panels, without frame and fastening pieces so as to permit mechanization of the process of manufacturing members and assembling three dimensional structures such as bodies of transport means.

This object is achieved according to the invention by an arrangement wherein in joints of thin-walled members realized by the aid of glue, at least one member is provided with a groove into which the edge of another member is introduced and pressed against the groove wall by means of an open channel member inserted thereinto, the glue layer being applied to the contacting surfaces of the groove and those of members entering said groove.

It is desirable that the open channel member be made U-shaped in cross section and inserted into the groove of a panel with its open side facing the groove.

The techniques of forming a joint consists in that the open channel member is made with such cross sectional dimensions so that after introduction into the groove of one of the members its lateral walls resiliently press the edge of another member against the groove wall.

Such a design of the joint of thin-walled members obviates the need for a frame in the structure of the bodies, decreases the number of members to a considerable extent, reduces the weight of the body by 20 to 25% as well as reduces the labor required for the manufacturing of the members and the assembling of three dimensional structures as the plastic bodies of transport mean.

An exemplary embodiment of the invention is shown in the appended drawings which illustrates thin-walled members being the panels of a lorry cab and in which:

DETAILED DESCRIPTION

Figure 1:
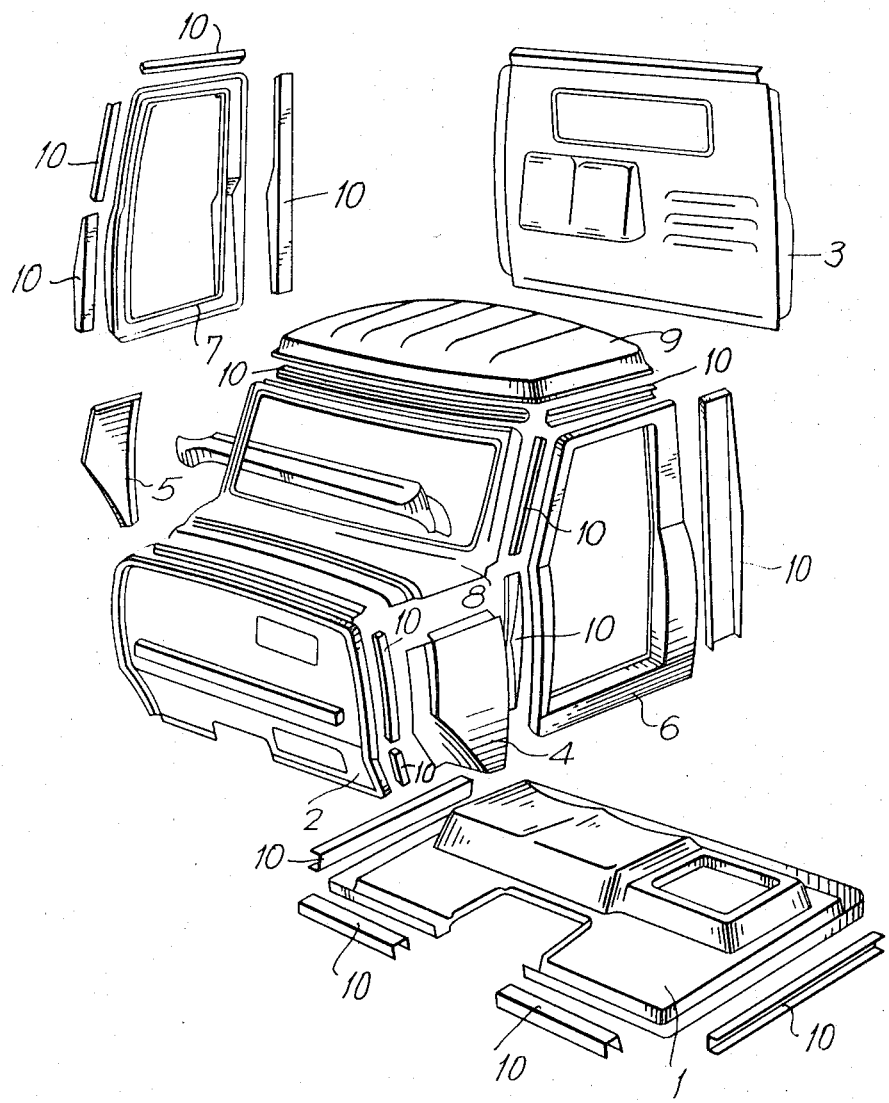
FIG. 1 schematically shows an exploded view of a lorry cab (in perspective)
Figure 2:
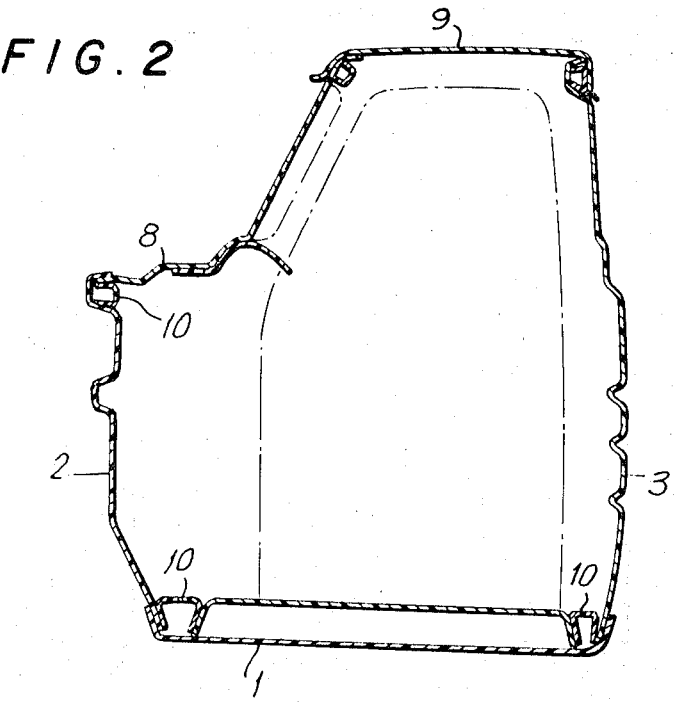
FIG. 2 shows the housing of a lorry cab (in longitudinal section)
Figure 3:
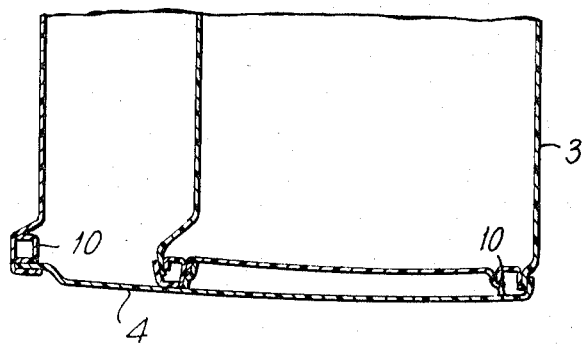
FIG. 3 is the cross sectional view of the cab.
Figure 4:
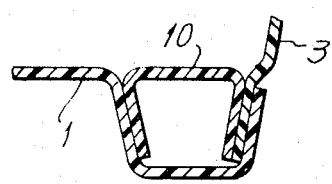
FIG. 4 is a section through a joint of the cab housing base and a rear panel of the housing.
Figure 5:
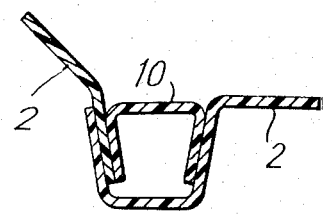
FIG. 5 is a section through a joint of the cab housing base and a front panel.
Figure 6:
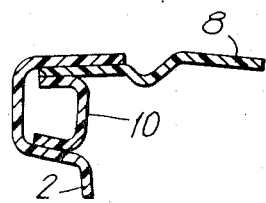
FIG. 6 is a section through a joint of a front panel and the windshield frame.
Figure 7:
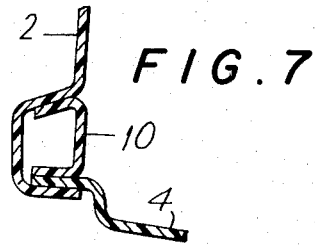
FIG. 7 is a section through a joint of the front panel and a lateral one.
Figure 8:
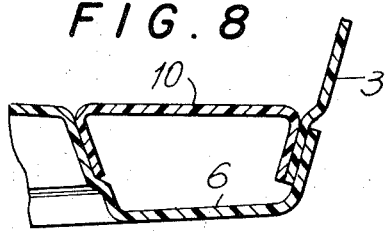
FIG. 8 is a section through a joint of a door opening and a rear panel.
Figure 9:
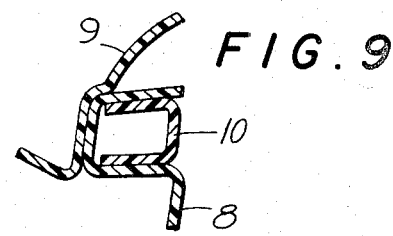
FIG. 9 is a section through a joint of the cab roof and the windshield frame.
Figure 10:
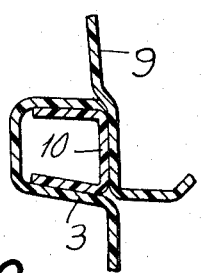
FIG. 10 is a section through a joint of the cab roof and the rear panel.

As follows from FIGS. 1, 2 and 3 the cab housing of a lorry comprises a base 1 provided with a groove along the perimeter thereof; which groove accommodates the lower edges of panels 2 (front), 3 (rear) and 4 and 5 (lateral) as well as lower edges of door frames 6 and 7.

The front panel 2 is provided with an upper groove for joining with the bottom edge of the windshield frame 8 and with two lateral grooves for joining with the lateral panels 4 and 5.

The door frames 6 and 7 have lateral grooves for joining with the lateral panels 4 and 5, the windshield frame and the rear panel 3.

The upper edges of the rear panel 3, the windshield frame 8 and the door frames 6 and 7 have ribs to which the roof of the cab housing is attached.

In all joints shown in FIGS. 4, 5, 6, 7 and 8 the edges of the panels 4, 5, 6, 7 and 8 are pressed against the walls of the respective grooves by the aid of open channel members 10 which are U-shaped in cross section. The length of these members 10 and the configuration thereof are determined by the design and shape of the groove.

Each element 10 is inserted into the corresponding groove in such a manner that its open side faces the groove.

The technique of forming joints shown in FIGS. 4, 5, 6, 7 and 8 consists in that each channel member 10 is made with such cross sectional dimensions that on introduction thereof into the corresponding groove of one of the panels its lateral walls resiliently press the edge of another panel against the groove wall.

All contacting members of the joints are covered with glue whereas the lateral walls of the channel members 10, prior to introduction thereof into the corresponding grooves, are squeezed together. The glue joints experience shifts and contractions which increase the strength and reliability of the joints.

All plastic panels and members of the cab housing may be made by a pressure technique.

The proposed frameless cab of a lorry meets the requirements of a highly mechanized production as it may be made by a mass production method.

What is claimed is:

1. A permanent joint for plastic thin-walled members of vehicle bodies, comprising: a first thin-walled plate member having an edge with a groove therealong; a second thin-walled plate member having an edge which enters said groove of the first thin-walled member such that the edge of the second plate member lies freely against a wall of the groove of the first plate member and extends therefrom, an open channel member forcibly inserted into said groove, said channel member having a base and upstanding walls on said base, the latter said walls initially having a spacing exceeding the width of the groove at the base thereof in said first thin-walled member with the second thin wall member inserted therein whereby when the channel member is inserted into said groove said walls converge towards one another to engage said thin-walled members and resiliently urge the walls of the members into contact with one another; and a glue compound applied on the contact surfaces of said members, whereby the contact surfaces are joined with said glue compound under pressure.

2. A joint as claimed in claim 1 wherein said groove in the first said thin-walled member is curved.

References Cited

UNITED STATES PATENTS

| | | | |
|---|---|---|---|
| 2,995,784 | 8/1961 | Driscoll | 52—416 |
| 3,143,939 | 8/1964 | Gregoire | 52—471 |
| 3,023,862 | 3/1962 | Launay | 287—189.36C |

DAVID J. WILLIAMOWSKY, Primary Examiner

W. L. SHEDD, Assistant Examiner

U.S. Cl. X.R.

52—416, 489; 287—20.92